United States Patent [19]
Wallbillich
[11] Patent Number: 5,075,365
[45] Date of Patent: Dec. 24, 1991

[54] CLOSING AND/OR SEALING OF ORIFICES, CAVITIES OR INTERSTICES IN PRINTING PLATES MOUNTED ON PLATE CYLINDERS

[75] Inventor: Guenter Wallbillich, Neustadt, Fed. Rep. of Germany

[73] Assignee: BASF Aktiengesellschaft, Ludwigshafen, Fed. Rep. of Germany

[21] Appl. No.: 174,360

[22] Filed: Mar. 25, 1988

[30] Foreign Application Priority Data

Mar. 31, 1987 [DE] Fed. Rep. of Germany ....... 3710146

[51] Int. Cl.[5] .............................................. C05K 5/24

[52] U.S. Cl. .................................. 524/261; 524/366; 524/546

[58] Field of Search ........................ 524/366, 546, 261

[56] References Cited

U.S. PATENT DOCUMENTS

| | | | |
|---|---|---|---|
| 2,056,991 | 10/1936 | Tomlin . | |
| 2,285,116 | 6/1942 | Grupe . | |
| 3,740,369 | 6/1973 | Proskow | 524/546 |
| 3,879,302 | 4/1975 | Reick | 524/546 |
| 4,157,328 | 6/1979 | Beyer et al. | 524/546 |
| 4,178,465 | 12/1979 | Caporiccio et al. . | |
| 4,515,375 | 5/1985 | Bleckmann et al. | 101/40.1 |
| 4,548,960 | 10/1985 | Bentley | 524/546 |
| 4,635,549 | 1/1987 | Bleckmann et al. . | |

FOREIGN PATENT DOCUMENTS

| | | |
|---|---|---|
| 0174568 | 3/1986 | European Pat. Off. . |
| 0175189 | 3/1986 | European Pat. Off. . |
| 2633445 | 2/1977 | Fed. Rep. of Germany . |
| 2545618 | 4/1977 | Fed. Rep. of Germany . |
| 2545124 | 1/1978 | Fed. Rep. of Germany . |
| 2633736 | 8/1986 | Fed. Rep. of Germany . |
| 363464 | 3/1986 | United Kingdom . |
| 2160882 | 10/1987 | United Kingdom . |

OTHER PUBLICATIONS

Deutscher Drucker Nr. 41 (1975) pp. 17-22.

*Primary Examiner*—Joseph L. Schofer
*Assistant Examiner*—Peter D. Mulcahy
*Attorney, Agent, or Firm*—Keil & Weinkauf

[57] ABSTRACT

Orifices, cavities or interstices which are formed when printing plates are mounted on plate cylinders are closed and/or sealed by means of a sealing or closing compound, a pasty material which is viscoplastic at room temperature and based on a dispersion of a solid, highly fluorinated olefin polymer powder in an inert, sparingly volatile, organic dispersing liquid being used as the sealing or closing compound.

11 Claims, No Drawings

CLOSING AND/OR SEALING OF ORIFICES, CAVITIES OR INTERSTICES IN PRINTING PLATES MOUNTED ON PLATE CYLINDERS

The present invention relates to a method for closing and/or sealing orifices, cavities or interstices, as occur when printing plates are mounted on plate cylinders, in particular in the region of the end or edge sections of the printing plates, by means of sealing or closing compound. The novel method is particularly suitable for closing and/or sealing orifices, cavities or interstices in gravure printing plates mounted on plate cylinders.

It is known that rotary printing plates are produced by wrapping flat printing plates around plate cylinders and fastening the said plates on the plate cylinders in a suitable manner, for example by adhesive bonding or magnetically or mechanically by means of suitable retaining and clamping elements. In this way, one printing plate or a plurality of printing plates can be mounted one behind the other and/or side by side on the surface of a printing cylinder. Because wrap round gravure printing plates are simple and economical to produce and to handle, this method for the production of rotary printing plates is particularly important in rotary gravure printing. The wrap round gravure printing plates are preferably mounted on the plate cylinder by bending over one or both of their end sections and hooking these bent-over regions in a groove provided for this purpose in the plate cylinder, with simultaneous clamping of the wrap round gravure printing plate.

When flat printing plates are mounted on a plate cylinder, the printing surface on the plate cylinder is interrupted by gaps, clamping slots or other interstices or cavities between the opposite ends or end regions of a printing plate which are unbent or bent over, or, if a plurality of printing plates are mounted one behind the other and/or side by side on a plate cylinder, between the abutting edges of the end and/or lateral regions of the printing plates. Such orifices or interstices which form when printing plates are mounted on plate cylinders must be closed in a suitable manner in order to avoid penetration of printing ink, which may, for example, break the adhesive bond between the printing plate and the plate cylinder or, particularly in gravure printing, may cause spraying of the printing ink and undesirable impressions of the gap, and also to ensure smooth running of the doctor blade and thus to prevent damage to the doctor blade and printing plate surface. Orifices and interstices can also form at the end faces of the plate cylinder, between the plate cylinder surface and the lateral regions of the mounted printing plate or between the printing plate surface and metal rings, which are usually employed in rotary gravure printing, are placed laterally adjacent to the printing cylinder and border the printing surface, and the said orifices and interstices must be sealed against penetration by printing ink or for other reasons to avoid problems during printing.

It has already been proposed that gaps or clamping slots formed during mechanical clamping of wrap round gravure printing plates on plate cylinders be closed by means of sealing strips, bands or cords of resilient or plastically deformable materials (cf. for example U.S. Pat. Nos. 2,056,991, 2,285,116, DE-A-25 45 124 or DE-A-26 33 445). This method of gap closure is only of limited use and expensive to carry out and furthermore frequently presents considerable difficulties because the sealing strip has to be matched to the shape of the orifice or joint to be closed and subsequent surface processing may be necessary.

It is also known that the gaps, clamping slots or other orifices and interstices, which are formed when printing plates are mounted on plate cylinders, can be closed by filling with materials which reach the state required for their function only as a result of chemical reaction, heat, drying or the like, for example adhesives, thermoplastics, hot melt adhesives, heat-curable or photocurable reaction resins or foams or liquid photopolymerizable materials. The use of such closing compounds for printing plates mounted on plate cylinders is described in, for example, Deutscher Drucker, No. 41 (1975), pages 17–22, DE-A-25 45 618, EP-A-118 866, EP-A-174 568, EP-A-175 189 or GB-A-2 160 882. With regard to shaping, these closing compounds generally present no problems but frequently have insufficient resistance to the printing ink solvents and/or have mechanical weaknesses under the loads applied during the printing process, in particular under the action of impression cylinders, the material being printed and, in gravure printing, also the doctor blade. Some of these known closing materials tend to embrittlement so that, after a short time, small cracks, which may fill with ink, form in the gap region. It is precisely the combined effect of the printing ink solvents and mechanical forces which not infrequently damage or even destroy these filling or closing compounds. However, even if these closing compounds have chemical and mechanical stability sufficient to meet the requirements, a tedious and expensive procedure is generally required to apply them and to obtain the required properties, and their use is mainly restricted to the closing of relatively broad or large gaps, orifices or other cavities or interstices.

It is an object of the present invention rapidly and effectively to seal and/or close the orifices and interstices, for example gaps, joints, holes, cavities and the like, formed when printing plates are mounted and fixed on plate cylinders, avoiding the prior art disadvantages and by an economical procedure, to give a continuous all-round printing plate surface which withstands the mechanical and chemical loads encountered during printing.

We have found, surprisingly, that this object is achieved, according to the invention, by the use of a pasty material which is viscoplastic at room temperature and is based on a dispersion of a solid, highly fluorinated olefin polymer powder in an inert, sparingly volatile, organic liquid as a sealing or closing compound for the application under discussion.

The present invention accordingly relates to a method for closing and/or sealing orifices, cavities or interstices, which are formed when printing plates are mounted on plate cylinders, by means of a sealing or closing compound, wherein the sealing or closing compound used is a pasty material which is viscoplastic at room temperature and based on a dispersion of a solid, highly fluorinated olefin polymer powder in an inert, sparingly volatile, organic dispersing liquid.

Although the novel method is applicable to all types of printing plates mounted on plate cylinders, for example letterpress and flexographic printing plates, it has proven particularly advantageous for gravure printing plates mounted on plate cylinders. By using the sealing and/or closing compounds according to the invention, not only can be printing plates be held and fixed in any desired position on the plate cylinders, but furthermore penetration of even low-viscosity printing ink into the stated orifices, cavities or interstices is prevented and the resulting disadvantages avoided. It was surprising that the orifices, cavities or interstices closed and/or sealed by the novel method have excellent chemical and mechanical stability and permanence under the requirements and loads encountered during printing and have no weaknesses, and that the rotary gravure printing plates produced by the novel method permit uniform, smooth and interruption-free sliding of the doctor blade over the printing plate surface without damaging the latter. The novel process is particularly advantageous since it is universally applicable, no curing or drying of the sealing or closing compound is required and the sealing or closing compound to be used according to the invention can be readily processed by the novel method. Although the novel method is suitable for closing and/or sealing any type of orifices, cavities or interstices in printing plates mounted on plate cylinders, it is particularly useful, and can be easily and advantageously employed, for closing and/or sealing small or narrow gaps, joints, other orifices, interstices and the like.

The sealing and/or closing compounds to be used according to the invention are stiff, pasty dispersions of solid, highly fluorinated, preferably perfluorinated, olefin polymer powders in inert, sparingly volatile, organic dispersing liquids, the said dispersions being viscoplastic at room temperature. Suitable highly fluorinated olefin polymers are both highly fluorinated homopolymers and highly fluorinated copolymers of olefins, in particular of ethylene and propylene, as well as highly fluorinated olefin polymers which contain ether groups in the polymer main chain. Examples of such ether groups which may be incorporated in the main chain of the highly fluorinated olefin polymers, in general in a minor amount, are the ($—CF_2—O—$), ($—CF_2—CF_2—O—$) and ($—CF(CF_3)—CF_2—O—$) groups. As a rule, the said dispersions contain solid, pulverulent homo- or copolymers of highly fluorinated, in particular perfluorinated, ethylene or highly fluorinated, in particular perfluorinated, propylene. These include, in particular, the polytetrafluoroethylenes, polyhexafluoropropylenes and tetrafluoroethylene/hexafluoropropylene copolymers. The solid, highly fluorinated olefin polymer powders present in the dispersions to be used according to the invention are finely divided and may contain, in addition to fluorine, a minor amount of other halogen atoms, in particular chlorine atoms. The solid, highly fluorinated olefin polymer powders are preferably perhalogenated, in particular perfluorinated.

The viscoplastic, pasty dispersions to be used according to the invention as sealing or closing compounds contain, in addition to the solid, highly fluorinated olefin polymer powders, one or more inert, sparingly volatile organic dispersing liquids as further components, which act as dispersants for the solid, highly fluorinated olefin polymer powders. Examples of suitable inert, sparingly organic dispersing liquids of this type are high boiling fluorohydrocarbon oils, fluorinated polyether oils, silicone oils or greases or fluorosilicone oils. The inert, organic dispersing liquids are generally sparingly volatile oils, but may also be lubricating greases. They have high heat stability and their viscosity generally shows little temperature dependence. They are chemically stable and have a boiling point of, in general, greater than 150° C., preferably greater than 200° C. Examples of the inert, sparingly soluble, organic dispersing liquids are the corresponding fluorohydrocarbon oils known per se; highly fluorinated, preferably perfluorinated, polyalkylene ether oils, preferable polyether oils which are composed of repeating oxyperfluoroalkylene units of the formulae $—CF_2—O—$, $—C_2F_4—O—$ and/or $—C_3F_6—O—$, as described in, for example, DE-A-2 633 736 or commercially available under the brand name FOMBLIN; silicone oils or greases, for example those of the polysiloxane type, e.g. polyphenylmethylsiloxane, or of the type comprising the network-like silicone polymers, for example methylsilicone polymers of oily or greasy consistency; and corresponding fluorinated silicone oils. For the dispersing liquids, the stated oils or greases can be used alone or as a mixture with one another.

The dispersions to be used according to the invention can be prepared in a conventional manner by thorough mixing, for example stirring or kneading, of the individual components. The type and amount of the solid, highly fluorinated olefin polymer powders and of the inert, sparingly volatile, organic dispersing liquids are chosen and matched with one another in such a way that a stable dispersion of the said olefin polymers in the said dispersing liquid is formed, and this dispersion has a stiff, pasty consistency and is viscoplastic at room temperature, so that it is deformable under the influence of pressure and shearing force but is not free-flowing. Usually, the dispersions to be used according to the invention are solvent-free and the weight ratio of highly fluorinated olefin polymer powder to inert, sparingly volatile, organic dispersing liquid in these dispersions is from about 3:7 to 6:4.

Examples of dispersions which are particularly suitable as sealing or closing compounds in the novel method are pasty, stiff, viscoplastic dispersions of polytetrafluoroethylene powder in perfluoropolyalkylene ether oils of the abovementioned type in a weight ratio of polymer to oil of about 35:65, and pasty, stiff, viscoplastic dispersions of polytetrafluoroethylene powder in silicone oil, for example polyphenylmethylsiloxane, in a weight ratio of polymer to oil of about 1:1.

The viscoplastic, pasty sealing or closing compounds to be used according to the invention adhere well to metallic and plastic surfaces so that, when they are used according to the invention for sealing and/or closing orifices, cavities or interstices in printing plates mounted on plate cylinders, a stable bond is obtained in the closed or sealed areas. Since the said sealing or closing compounds do not cure or change in any other way, e.g. shrink, the desired effect is maintained without restriction during the entire print run when the said compounds are used according to the invention. In particular, they are completely resistant to the printing ink solvents, i.e. they do not swell or soften or change in their other properties. Another advantage of the viscoplastic, pasty dispersions to be used as a sealing or closing compound in the novel method is that during printing they adapt, even under the action of impression cylinder and doctor blade, in shape and in surface characteristics to the requirements in the press, such as the mechanical characteristics of the printing gap or of the doctor blade bevel. Furthermore, the said dispersions are toxicologically completely acceptable and very heat-stable, i.e. they do not change even at temperatures up to about 200° C. or higher.

The viscoplastic, pasty dispersions of the stated type can be widely used according to the invention for closing and/or sealing orifices, cavities or interstices which are formed when printing plates are mounted on plate cylinders. For example, the said dispersions can be introduced between the printing plate and the plate cylinder, thus not only bonding and fixing the printing plate to the plate cylinder but at the same time avoiding penetration of printing ink between the printing plate and the plate cylinder. For this purpose, it may be advantageous if the joint between the lateral regions of the printing plate and the surface of the plate cylinder is sealed or closed at the end faces of the cylinder by means of the viscoplastic, pasty dispersions to be used according to the invention. It has also proven particularly advantageous if the ends of the printing plate which generally run parallel to the plate cylinder axis are applied firmly to the cylinder surface by means of the said dispersions and are thus simultaneously sealed against penetration of printing ink. This variant of the method is particularly advantageous if the printing plate end to be fastened has not been bent over but lies flat on the cylinder surface. It is of course also possible to use the said dispersions to mount, on the plate cylinder, bent-over end regions of printing plates, which are hooked in a groove let into the plate cylinder and if necessary provided with retaining and clamping elements, during mounting on the plate cylinder, in order to fix the bent-over end region of the printing plate in the hook-in groove and at the same time seal the resulting orifices and interstices. Moreover, the viscoplastic, pasty dispersions to be used according to the invention can be used to close and seal the gap formed between the unbent or bent-over end regions of the printing plate when a printing plate is wrapped round a plate cylinder, or, where a plurality of printing plates are mounted one behind the other and/or side by side on a plate cylinder, to close and seal the gaps formed between the end and/or lateral regions of these printing plates mounted on a plate cylinder. A particular advantage found is that even very narrow and small gaps or joins which are formed between the end and/or lateral regions of the printing plates when the latter are mounted on a plate cylinder can be readily closed according to the invention. In principle, all orifices, cavities or interstices which are formed when printing plates are mounted on plate cylinders and which are troublesome or lead to problems, for example due to penetrating printing ink, during the subsequent printing process can be sealed and/or closed by means of the viscoplastic, pasty dispersions to be used according to the invention.

Of course, it is also possible or the said dispersions to be used together with other closing compounds in the novel method. If it is necessary or desirable, for example for the production of printing plates for web-fed rotary gravure printing, to fill the gap formed between the plate ends, when the gravure printing plate is clamped on the plate cylinder, by means of a conventional curable gap closing compound, in particular a photocurable gap closing compound, so that image information can also be introduced into the gap area, the said dispersions can be used, for example, for sealing the lateral end points of the gap or for closing individual orifices or joints which are required for the closing process using curable gap-closing compounds.

The viscoplastic, pasty dispersions to be used as sealing or closing compounds in the novel process can be applied in a very simple manner by simple application of the viscoplastic, pasty dispersion to the areas of the printing plates and/or plate cylinders which are to be sealed and by simple mechanical contact pressure or firm pressure or by pressing into the orifices or cavities to be sealed, for example by means of a spatula, scraper or the like. Excess dispersion material can then easily be removed by simply wiping it away from the printing plate surface or the end faces of the printing plate cylinder thus obtained. Hence, according to the invention, special apparatuses or costs for closing and/or sealing the orifices and gaps as well as a particular, for example mechanical, aftertreatment for adapting the closed gap to the surface contour of the cylinder are dispensed with. Of course, the viscoplastic, pasty dispersions to be used in the novel process as sealing or closing compounds can also be readily and rapidly mechanically peeled off or removed again in order to remove the printing plates from the plate cylinder without special apparatuses being required or costs incurred for this procedure and without the printing plate or the plate cylinder being damaged. This is another particular advantage of the novel process. The printing plates used can be reused without restriction.

All known and commonly used printing plates which can be clamped on plate cylinders of a sheet-fed or web-fed rotary printing press, for example the known photopolymer letterpress plates and flexographic printing plates, can be used in the novel process. The novel process is particularly advantageous for gravure printing plates mounted on plate cylinders of a rotary gravure printing press. The process according to the invention is therefore suitable both for the conventional metal gravure printing plates having a Ballard skin and especially, and particularly advantageously, for gravure printing plates which have plastic printing layers and in which a plastic printing layer is applied to a suitable printing layer base, in particular of metal, the ink-receiving depressions (wells) having been made in the said printing layer, either by mechanical engraving or by laser engraving (cf. for example DE-A-27 52 500 or DE-A-30 28 098) or photomechanically by imagewise exposure and development of a suitable photosensitive recording material (cf. for example DE-A-20 54 833, DE-A-20 61 287, EP-A-70 510 and EP-A-70 511). For the purposes of the present invention, gravure printing plates are the finished gravure printing plates in which the ink-conveying depressions have already been made, as well as the gravure printing plate blanks in which the wells have not yet been formed. This means that it is possible to clamp a finished gravure printing plate on the plate cylinder and then to seal and/or close, according to the invention, the resulting orifices, cavities and interstices, as well as to mount gravure printing plate blanks on the plate cylinder and to close and/or seal, according to the invention, the resulting orifices, cavities or interstices, before making the wells in the printing layer of the printing plates. For the purposes of the present invention, printing plates are very generally both the printing plate blanks which do not yet contain any image information and the finished printing plates which contain image information with differentiation of the printing and non-printing areas.

I claim:

1. A method of closing and/or sealing orifices, cavities or interstices, which are formed when printing plates are mounted on a plate cylinder, which process comprises:

applying to the orifices, cavities or interstices as a sealing compound, a dispersion consisting essentially of a finely divided, highly fluorinated olefin polymer powder dispersed in a sparingly volatile organic liquid having a boiling point greater than 150° C., said dispersion having a stiff, pasty, non-free-flowing consistency and being viscoplastic at room temperature and deformable under the influence of pressure and shearing forces.

2. The method of claim 1, wherein the dispersion contains a solid, perfluorinated ethylene or propylene homo- or copolymer powder.

3. The method of claim 2, wherein the dispersion contains a polytetrafluorethylene, polyhexafluoropropylene, tetrafluoroethylene/hexafluoropropylene copolymer or a blend of these as the solid, perfluorinated olefin polymer powder.

4. The method of claim 1, wherein the dispersion contains, as the inert, sparingly volatile, organic dispersing liquid, fluorohydrocarbon oils, highly fluorinated polyether oils, silicone oils or greases or fluorosilicone oils, which serve as dispersants for the highly fluorinated olefin polymer powders.

5. The method of claim 4, wherein the dispersion contains, as the inert, sparingly volatile, organic dispersing liquid, a perfluorinated polyalkylene ether oil which is composed of repeating units of the formulae —$CF_2$—O—, —$C_2F_4$—O— and/or —$C_3F_6$—O—, or a mixture of such oils.

6. The method of claim 4, wherein the dispersion contains, as the inert, sparingly volatile, organic dispersing liquid, polysiloxanes or fluorinated polysiloxanes of oily or greasy consistency.

7. The method of claim 1, wherein the dispersion contains the highly fluorinated olefin polymer powder and the inert, sparingly volatile, organic dispersing liquid in a weight ratio of from about 3:7 to 6:4.

8. The method of claim 1 wherein a viscoplastic, pasty dispersion of polytetrafluoroethylene powder in perfluorinated polyalkylene ether oils which contain repeating units of the formulae —$CF_2$—O—, —$C_2F_4$—O— and/or —$C_3F_6$—O— is used in a weight ratio of polytetrafluoroethylene to perfluorinated polyalkylene ether oil of about 35:65.

9. The method of claim 1, wherein a viscoplastic, pasty dispersion of polytetrafluoroethylene powder in polyphenylmethylsiloxane is used in a weight ratio of polytetrafluoroethylene to polyphenylmethylsiloxane of about 1:1.

10. The method of claim 1, wherein, for closing or sealing the orifices, cavities or interstices, the viscoplastic, pasty dispersion is applied mechanically and pressed firmly or pressed in.

11. The method of claim 1, wherein the highly fluorinated olefin polymer powder is polytetrafluoroethylene and the dispersing liquid is perfluoropolyalkylene ether oil.

* * * * *